Patented Feb. 24, 1953

2,629,668

UNITED STATES PATENT OFFICE 2,629,668

LINOLEUM BINDER CONTAINING ESTERS FORMED BY REACTING UNSATURATED DRYING OIL FATTY ACIDS AND HYDROXYALKYL ETHERS OF POLYHYDRIC ALCOHOLS

Carl T. Fiscella, Rutherford, N. J., assignor to Heyden Chemical Corporation, New York, N. Y., a corporation of Delaware No Drawing. Application August 18, 1948, Serial No. 44,996

8 Claims. (Cl. 106—243)

My invention relates particularly to binders for linoleum compositions and the linoleum compositions and products made therewith.

Previous linoleum binders were generally prepared by gelling polyhydric alcohol esters of drying oil fatty acids in the presence of rosin or a gum. This procedure was followed whether a natural triglyceride, such as linseed oil, or one of the synthetic drying oils is used. The rosin serves as a flux, as it prevents premature gelation of the oil. The presence of the rosin, however, has been found to result in decreased flexibility and chemical resistance in producing the final product.

I have found that the substitution of one or more hydroxyalkyl ethers of polyhydric alcohols for the unmodified alcohols ordinarily used previously, results in obtaining products having unusually good flexibility and water resistance. In addition, the bodying characteristics of these hydroxyalkyl ethers are such that a satisfactorily cross-linked system can be achieved even with substantially decreased amounts of rosin, thus reducing or eliminating its inherently deleterious properties. Even when for economic or other reasons rosin is used in preparing the binder, the properties of the products obtained, containing the polyhydric alcohol hydroxyalkyl ethers, are markedly superior to those obtained with binders containing unmodified polyhydric alcohols. This is found to be the case whether the alcohol used in preparing the ether is sorbitol, mannitol, pentaerythritols, by which I mean pentaerythritol, dipentaerythritol, tripentaerythritol, and technical mixtures of the same, or one of the other commonly used polyhydric alcohols together with an alkene oxide, ethylene oxide, propylene oxide or butadiene monoxide. However, I have found that the hydroxyalkyl ether of the polyhydric alcohol chosen for use in this invention should be one that can form a gel when reacted with a drying oil acid.

An object of my invention is to provide linoleum binders of a more advantageous character and with which linoleum products can be obtained having an improved flexibility as shown by standard tests. A further object is to obtain products thereby which are more resistant to water than in the case of previous commercial linoleum. Further objects of my invention will be apparent from the detailed description hereinafter.

While my invention is capable of embodiment in many different forms, by way of illustration I have described hereinafter only certain embodiments of my invention.

For example, a series of mono-, di- and tripentaerythritol linoleum compositions has been chosen to illustrate this invention. The first (Example A) may be considered to be a standard dipentaerythritol formulation for linoleum since therein dipentaerythritol is combined with linseed oil and rosin to form a binder. The alcohol used in Example B is the reaction product of dipentaerythritol and propylene oxide in which there are two equivalents of propylene oxide present for each equivalent weight of dipentaerythritol. The alcohol used in Example C contains still more propylene oxide per mole of dipentaerythritol, and, therefore, the linoleum binders containing it show more clearly the advantages of the invention.

In the remaining examples the reaction products of the pentaerythritols, technical pentaerythritol, dipentaerythritol, tripentaerythritol, with ethylene oxide or propylene oxide, are contained in linoleum compositions.

The alcohol-alkene oxide reaction products were prepared according to the directions given in the patent to Bowman et al., No. 2,401,743, upon Processes of Producing Ether Alcohols, granted June 11, 1946, or in the pending patent application of Herman Sokol, Ser. No. 600,219, filed June 18, 1945, now Patent No. 2,527,970.

Example A

A rosin-containing binder is made as follows: To 2200 parts by weight of linseed oil at 150° C. there is added 74.5 parts by weight of dipentaerythritol. The mixture is heated at 250° C. for an hour and then cooled at 150° C., whereupon 550 parts by weight of rosin are added to it and the mixture is heated at 235° C. for an hour and then at 300° C. for one-half hour. After a short storage period the ester is heated to 240° C., and 2% by weight of a drying agent, such as litharge (based on the weight of the oil) is added to it. Air is bubbled through the batch which is heated at the temperature of 240° C. for six hours to bring about gelation. The gel has the following composition by weight: petroleum ether extractables 23.8%, ethyl ether extractables 33.3% and linoxyn 42.9%.

A linoleum composition is prepared therefrom by mixing together by weight, 270 parts of the above binder, 210 parts of a filler, such as wood flour, and pigments such as 141 parts of titanium oxide, 141 parts of whiting and 30 parts of ultramarine blue, on a rubber mill at 185°–200° F. until a homogeneous mass is obtained. This requires about 15 minutes. After three days storage the batch is reworked and sheeted.

Instead, in the said binder, a different drying oil, any other polyhydric alcohol among those mentioned herein and a different drying agent could be used if desired. Also, it will be understood that any other desired flux, such as any gum, may be substituted for rosin.

The sheets are placed in an oven and stoved at 80° C. for 50 days after which time they show satisfactory compression and resilience when tested with an 80 pound load and an 0.178 inch diameter pin on a testing apparatus. A sample of this linoleum absorbs 2.10% water by weight when placed in distilled water at room temperature for 24 hours. When tested with a 5% solution of sodium hydroxide, the sample is etched to a depth of 0.003 cm. in an hour. The sheet has a flexibility of 16° when tested on a flexibility board using a 20 gram weight for 10 seconds, whereas a sample of commercial linoleum showed 14° flexibility when so tested.

*Example B*

An ester is prepared by heating 150 parts by weight of the reaction product of one mole of dipentaerythritol and twelve moles of propylene oxide (Eq. Wt.—86.7) with 490 parts by weight of linseed oil fatty acids at 250° C. for 8 hours. The reaction is carried out in an atmosphere of $CO_2$. After ageing for a short time the ester is heated at 240° C. for 70 minutes to bring it to the point of gelation. The gel contains by weight 38.4% of petroleum ether extractables, 34.4% of ethyl ether extractables, and 27.1% of linoxyn.

A linoleum composition is prepared therefrom by mixing by weight, 391.5 parts of this gel with 304.5 parts of wood flour, 204.4 parts of titanium dioxide, 204.4 parts of whiting, and 43.5 parts of ultramarine blue, on rubber rolls at 185°–200° F. for about 15 minutes. Three days later 13.5% by weight (based on the weight of the dipentaerythritol-propylene oxide reaction product linoleum composition) of the rosin-containing binder described in Example A is added thereto, and the mixture is milled to a homogeneous cohesive mass. The material is sheeted and then cured in an oven at 80° C. for 47 days.

The cured sample thus obtained has a flexibility of 25°. It absorbs 2.02% water by weight when placed in distilled water at room temperature for 24 hours and is etched to a depth of 0.004 cm. when tested for an hour with 5% caustic.

*Example C*

An ester is prepared by reacting 150 parts by weight of the reaction product of one mole of dipentaerythritol and thirty moles of propylene oxide (Eq. Wt.—205) with 208 parts by weight of linseed oil fatty acids at 250° C. for 4 hours. The acid number at the end of this time is 5 mg. KOH/g. After an aging period the ester is heated at 240° C. for 40 minutes to bring it to a point of gelation. The gel contained by weight, 45.8% of petroleum ether extractables, 19.4% of ethyl ether extractables, and 34.8% of linoxyn. Two hundred and seventeen parts by weight of this gel, 168.7 parts by weight of wood flour, 113.2 parts by weight of titanium dioxide, 113.2 parts by weight of whiting, and 24.1 parts by weight of ultramarine blue, are mixed together homogeneously on the rubber rolls heated at 185°–200° F. After three days aging, 13.5% by weight (based on the weight of the dipentaerythritol-propylene oxide reaction product binder) of the rosin-containing binder described in Example A is added, and the batch is reworked and sheeted. The sheets are cured at 80° C. for 45 days before being tested. When tested in 5% caustic for an hour, a sample is etched to a depth of 0.004 cm. The water absorption of this composition is 1.54% by weight in 24 hours. Its flexibility, using a 20 gram weight for 10 seconds, is 40°.

The data presented above is summarized in the following table:

| Example | A | B | C |
|---|---|---|---|
| Alcohol used in preparing binder | DiPE | (²) | (³) |
| Seasoning Time in Days ¹ | 50 | 47 | 45 |
| Water Absorption ___ percent | 2.10 | 2.02 | 1.54 |
| Alkali Resistance ___ cm | 0.003 | 0.004 | 0.004 |
| Flexibility ___ degrees | 16 | 25 | 40 |

¹ The length of time required in a forced convection oven at 80° C. before the sample shows the required average residual indentation when tested with an 80 pound load and a 0.178 inch pin on a testing apparatus. This is the method described in Federal Specifications LLL-L-367 for linoleum.
² Reaction product of one mole technical dipentaerythritol and twelve moles propylene oxide.
³ Reaction product of one mole technical dipentaerythritol and thirty moles of propylene oxide.

*Example D*

Five hundred and eighty parts by weight of the reaction product of one mole of dipentaerythritol and 12 moles of ethylene oxide (equivalent weight—141) is heated with 1165 parts by weight of linseed oil fatty acids at 250° C. for 8 hours and 40 minutes and then at 275° C. for one hour. This heating period is sufficient to bring the ester to the point of gelation. Two hundred and seventeen parts of this gel, 168.7 parts of wood flour, 113.2 parts of titanium dioxide, 24.1 parts of ultramarine blue, 113.2 parts of whiting, and 86 parts of the rosin-containing binder described in Example A by weight are mixed on a rubber mill at 185°–200° F. until a homogeneous composition results. This material is sheeted and two weeks later is remilled and resheeted without difficulty. Like the linoleum compositions described in Examples B and C, this composition is more flexible than commercial linoleum samples and also more resistant to water.

*Example E*

A linoleum composition containing the reaction product of one mole of technical grade of pentaerythritol and four moles of propylene oxide (equivalent weight—96) is prepared according to the procedure described in Example D. It shows good flexibility and water resistance when tested by the methods previously described herein.

*Example F*

A linoleum composition containing the reaction product of one mole of technical pentaerythritol with 24 moles of ethylene oxide (equivalent weight —283) is prepared according to the procedure described in Example D. The product thus obtained is also more flexible and more resistant to water than samples of commercial linoleum.

*Example G*

A linoleum composition containing in its binder the reaction product of one mole of tripentaerythritol and 40 moles of propylene oxide (equivalent weight—254) is prepared according to the procedure described in Example D. The product has good flexibility, alkali resistance and reworking properties.

While I have described my invention above in detail I wish it to be understood that many changes may be made therein without departing from the spirit of the same. It will be understood, for instance, that the relative amounts of the ester and binder, also the kind and amounts of the filler and pigments in all the above examples can be changed widely within the scope of my invention.

I claim:

1. A linoleum material comprising filler and binder containing the reaction product of a hydroxyalkyl ether of a polyhydric alcohol containing at least four hydroxyl groups, said ether having been formed by reacting a polyhydric alcohol containing at least four hydroxyl groups with an alkene oxide, and an unsaturated drying oil fatty acid, all of the hydroxyl groups of said hydroxyalky ether being esterified by reaction with said drying oil fatty acid.

2. A linoleum material comprising filler and binder containing the reaction product of a hydroxyalkyl ether of pentaerythritol, said ether having been formed by reacting pentaerythritol with an alkene oxide and an unsaturated drying oil fatty acid, all of the hydroxyl groups of said hydroxyalkyl ether being esterified by reaction with said drying oil fatty acid.

3. A linoleum material comprising filler and binder containing the reaction product of a hydroxyalkyl ether of pentaerythritol, said ether having been formed by reacting pentaerythritol with a propylene oxide and an unsaturated drying oil fatty acid, all of the hydroxyl groups of said hydroxyalkyl ether being esterified by reaction with said drying oil fatty acid.

4. A linoleum material comprising filler and binder containing the reaction product of a hydroxyalkyl ether of pentaerythritol, said ether having been formed by reacting pentaerythritol with ethylene oxide and an unsaturated drying oil fatty acid, all of the hydroxyl groups of said hydroxyalkyl ether being esterified by reaction with said drying oil fatty acid.

5. A linoleum material comprising filler and binder containing the reaction product of a hydroxyalkyl ether of dipentaerythritol, said ether having been formed by reacting dipentaerythritol with an alkene oxide and an unsaturated drying oil fatty acid, all of the hydroxyl groups of said hydroxyalkyl ether being esterified by reaction with said drying oil fatty acid.

6. A linoleum material comprising filler and binder containing the reaction product of a hydroxyalkyl ether of dipentaerythritol, said ether having been formed by reacting dipentaerythritol with propylene oxide and an unsaturated drying oil fatty acid, all of the hydroxyl groups of said hydroxyalkyl ether being esterified by reaction with said drying oil fatty acid.

7. A linoleum material comprising filler and binder containing the reaction product of a hydroxyalkyl ether of dipentaerythritol, said ether having been formed by reacting dipentaerythritol with ethylene oxide and an unsaturated drying oil fatty acid, all of the hydroxyl groups of said hydroxyalkyl ether being esterified by reaction with said drying oil fatty acid.

8. A linoleum material comprising filler and binder containing the reaction product of a hydroxyalkyl ether of tripentaerythritol, said ether having been formed by reacting tripentaerythritol with propylene oxide and an unsaturated drying oil fatty acid, all of the hydroxyl groups of said hydroxyalkyl ether being esterified by reaction with said drying oil fatty acid.

CARL T. FISCELLA.

REFERENCES CITED

The following references are of record in the file of this patent:

UNITED STATES PATENTS

| Number | Name | Date |
| --- | --- | --- |
| 1,693,917 | Eisenstein | Dec. 4, 1928 |
| 1,739,315 | Kessler et al. | Dec. 10, 1929 |
| 2,221,674 | Ellis | Nov. 12, 1940 |
| 2,275,494 | Bennett | Mar. 10, 1942 |
| 2,409,332 | Woodruff | Oct. 15, 1946 |
| 2,450,079 | Brown | Sept. 28, 1948 |
| 2,495,305 | Wyler | Jan. 24, 1950 |
| 2,500,349 | De Groote | Mar. 14, 1950 |